United States Patent
Murray

(10) Patent No.: US 7,193,405 B2
(45) Date of Patent: Mar. 20, 2007

(54) ELECTRONIC MULTI-DEPTH OBJECT LOCATOR WITH SELF-ILLUMINATING OPTICAL ELEMENT WARNING AND DETECTION

(75) Inventor: John C Murray, Canton, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 11/143,725

(22) Filed: Jun. 3, 2005

(65) Prior Publication Data

US 2005/0280425 A1    Dec. 22, 2005

Related U.S. Application Data

(60) Provisional application No. 60/577,190, filed on Jun. 7, 2004.

(51) Int. Cl.
G01R 19/00 (2006.01)
G09F 13/18 (2006.01)
G01V 3/08 (2006.01)

(52) U.S. Cl. .................... 324/67; 362/559; 324/326
(58) Field of Classification Search .............. 324/66, 324/67, 556, 133, 671
See application file for complete search history.

(56) References Cited

U.S. PATENT DOCUMENTS

| | | | |
|---|---|---|---|
| 4,044,299 A * | 8/1977 | Weber ...................... 324/326 |
| 4,099,118 A | 7/1978 | Franklin et al. |
| 4,464,622 A | 8/1984 | Franklin |
| 4,647,150 A * | 3/1987 | DeSanti et al. ............ 385/98 |
| 4,837,489 A | 6/1989 | McFee |
| 4,853,617 A | 8/1989 | Douglas et al. |
| 4,868,910 A * | 9/1989 | Maulding ................. 324/233 |
| 4,881,028 A * | 11/1989 | Bright ...................... 324/127 |
| 4,992,741 A | 2/1991 | Douglas et al. |
| 4,998,058 A | 3/1991 | Tofte et al. |
| 5,148,108 A | 9/1992 | Dufour |
| 5,268,823 A * | 12/1993 | Yergenson ................ 362/555 |
| 5,317,253 A | 5/1994 | Kronberg |
| 5,345,471 A | 9/1994 | McEwan |
| 5,352,974 A | 10/1994 | Heger |
| 5,444,364 A | 8/1995 | Satterwhite et al. |
| 5,457,394 A | 10/1995 | McEwan |
| 5,512,834 A | 4/1996 | McEwan |
| 5,541,605 A | 7/1996 | Heger |
| 5,543,799 A | 8/1996 | Heger |
| 5,729,143 A | 3/1998 | Tavernetti et al. |
| 5,773,971 A | 6/1998 | Tavernetti |
| 5,854,603 A | 12/1998 | Heger |
| 5,896,102 A | 4/1999 | Heger |
| 5,900,833 A | 5/1999 | Sunlin et al. |
| 5,905,455 A | 5/1999 | Heger et al. |

(Continued)

*Primary Examiner*—Anjan Deb
(74) *Attorney, Agent, or Firm*—Pillsbury Winthrop Shaw Pittman LLP

(57) ABSTRACT

An embodiment of the invention provides a sensing device that includes a sensing circuit and a mode selection input device. The sensing circuit senses the presence of an object beneath a surface. The mode selection input device allows a user to select, using a single button, a desired mode from among at least three sensitivity modes without first accessing another sensitivity mode. In another embodiment, a sensing device includes a sensing circuit and a display. The sensing circuit senses the presence of a live electrical wire beneath a surface. The display includes an optical element and a light source to indicate the sensed presence of the live electrical wire.

22 Claims, 12 Drawing Sheets

U.S. PATENT DOCUMENTS

| | | | |
|---|---|---|---|
| 5,917,314 A | 6/1999 | Heger et al. | |
| 5,929,757 A | 7/1999 | Sternal et al. | |
| D419,149 S | 1/2000 | Krantz et al. | |
| D419,544 S | 1/2000 | Krantz | |
| D419,545 S | 1/2000 | Krantz et al. | |
| D419,546 S | 1/2000 | Krantz et al. | |
| 6,023,159 A | 2/2000 | Heger | |
| D427,166 S | 6/2000 | Krantz | |
| 6,130,539 A | 10/2000 | Polak | |
| 6,198,271 B1 | 3/2001 | Heger et al. | |
| 6,211,662 B1 | 4/2001 | Bijawat et al. | |
| 6,215,293 B1 * | 4/2001 | Yim | 324/67 |
| 6,229,294 B1 | 5/2001 | Wun | |
| 6,249,113 B1 * | 6/2001 | Krantz et al. | 324/67 |
| 6,259,241 B1 * | 7/2001 | Krantz | 324/67 |
| D455,430 S | 4/2002 | Krantz | |
| D455,750 S | 4/2002 | Krantz | |
| 6,593,754 B1 | 7/2003 | Steber et al. | |
| 6,894,508 B2 * | 5/2005 | Sanoner et al. | 324/662 |
| 2001/0007420 A1 | 7/2001 | Bijawat et al. | |
| 2002/0047709 A1 * | 4/2002 | Fling | 324/326 |
| 2002/0054798 A1 | 5/2002 | Dills et al. | |
| 2002/0135347 A1 | 9/2002 | Morgan et al. | |
| 2003/0201783 A1 | 10/2003 | Steber et al. | |
| 2003/0218469 A1 | 11/2003 | Brazell et al. | |
| 2004/0000918 A1 | 1/2004 | Sanoner et al. | |
| 2004/0239305 A1 * | 12/2004 | Clauss et al. | 324/67 |
| 2004/0264175 A1 * | 12/2004 | Willoughby | 362/105 |

* cited by examiner

ELECTRONIC MULTI-DEPTH OBJECT LOCATOR WITH SELF-ILLUMINATING OPTICAL ELEMENT WARNING AND DETECTION

CROSS-REFERENCE TO RELATED APPLICATION

This application relies for priority on U.S. Provisional Patent Application Ser. No. 60/577,190, filed Jun. 7, 2004, the contents of which are incorporated herein by reference.

BACKGROUND

1. Field

The invention relates to handheld electronic object locators.

2. Description of Related Art

Sensors (locators) to detect wood studs, metal studs, or other objects typically employ LEDs, LCD displays with graphics, and/or audio buzzers to indicate the detection of an object beneath a surface. When a sensor detects an object, the LEDs and/or the graphics on the LCD display deliver a small visual indication of the detection. Such techniques are also employed when detecting live electrical wires.

Examples of prior art sensors include those disclosed in U.S. Pat. Nos. 4,992,741 and 6,211,662, assigned to The Stanley Works (New Britain, Conn.).

SUMMARY

The below summary presents certain embodiments of the invention. It is to be appreciated that additional embodiments are described in the following detailed description, and that the below summary is not limiting of the invention.

An embodiment of the invention provides a sensing device that includes a sensing circuit and a mode selection input device. The sensing circuit senses the presence of an object beneath a surface. The mode selection input device allows a user to select, using a single button, a desired mode from among at least three sensitivity modes without first accessing another sensitivity mode. In another embodiment, a sensing device includes a sensing circuit and a display. The sensing circuit senses the presence of alternating current (A/C) beneath a surface. The display includes an optical element and an LED to indicate the sensed presence of A/C.

DETAILED DESCRIPTION

The invention relates to handheld electronic object locators. In particular, embodiments relate to a handheld tool that provides wood and metal stud detection and/or live wire detection.

Figure 1A:
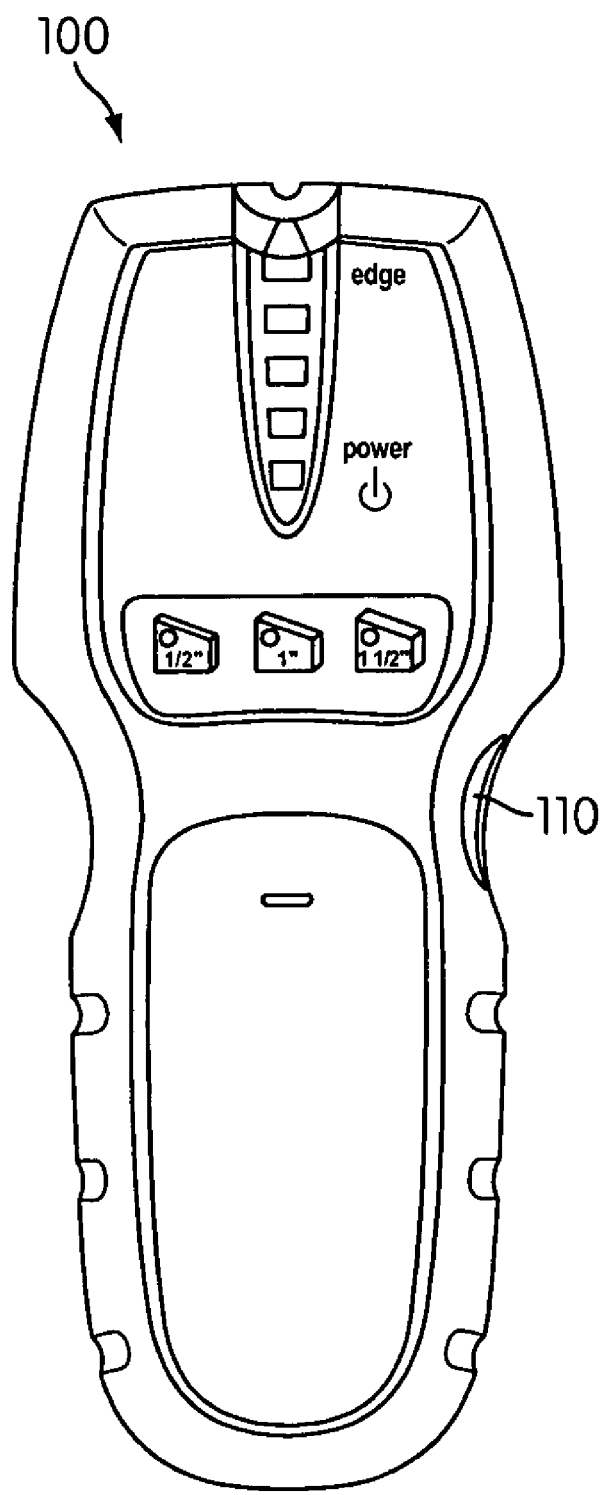
FIG. 1A shows a handheld sensor according to an embodiment of the invention.

FIG. 1A shows a handheld sensor 100 according to an embodiment of the invention. The sensor 100 is used to detect the presence of objects hidden behind a surface, such as metal or nonmetallic (e.g., wood) objects, such as studs. The sensor 100 can be operated in multiple sensitivity modes. For instance, the sensor 100 may support depth modes, whereby the sensor can detect objects at depths of ½ inch, 1 inch, and/or 1½ inches, for example. Alternatively or additionally, the sensor 100 may support structural composition modes, whereby the sensor is calibrated to detect objects behind or within concrete, drywall, plasterboard, and/or other building materials.

The sensor 100 includes a single button or switch 110 by which a user can select from among multiple sensitivity modes. For instance, the button 110 may be used to select, as desired, a ½ inch, 1 inch, and/or 1½ inches depth mode. In FIG. 1A, the shape and configuration of the sensor 100, including the position of the button 110 on the sensor 100, are exemplary in nature. In an embodiment, the button 110 also may act as an "on" button for the sensor 100. When the button 110 is released, the sensor is turned off.

Figure 1B:
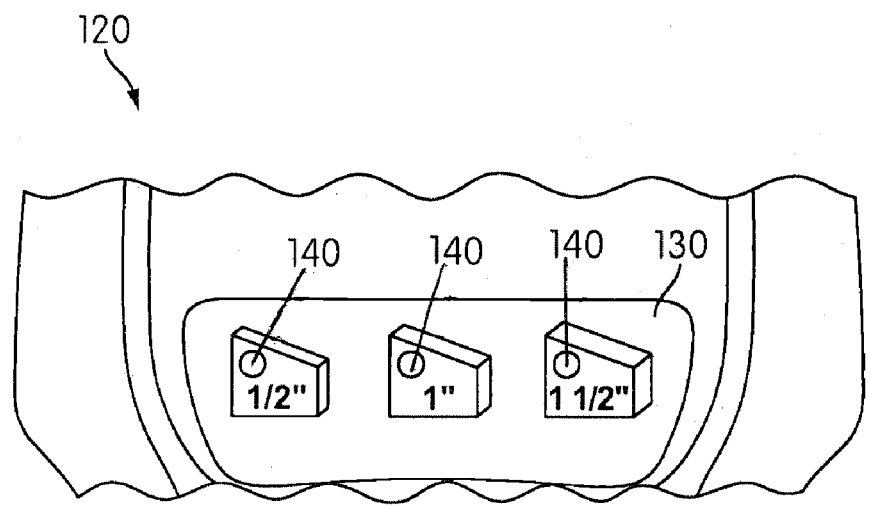
FIG. 1B shows an example display of a handheld sensor according to an embodiment of the invention.

FIG. 1B shows an example display 120 of a handheld sensor according to an embodiment of the invention. The display 120 identifies for a user the depth mode in which the sensor is currently operating. In particular, the display 120 includes a label 130 with symbolic representations corresponding to various detection modes. The label 130 is superimposed over an LED window including three LEDs 140, each LED corresponding to a respective one of the symbolic representations of a different depth sensitivity mode. When ½ inch detection mode is selected and the sensor is successfully calibrated for that mode, the leftmost LED light ups. When 1 inch mode is selected and the sensor is calibrated, the center LED lights up. When 1½ inches mode is selected and the sensor is calibrated, the rightmost LED lights up.

Figure 1C:
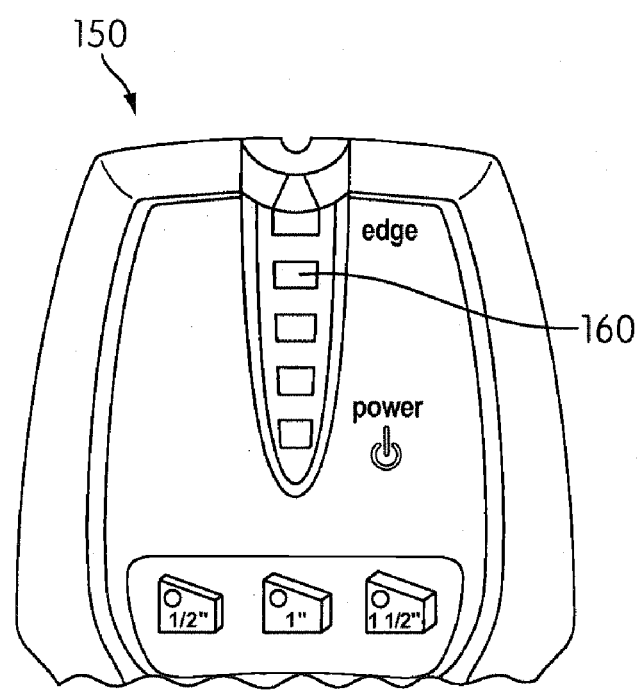
FIG. 1C shows an example display of a handheld sensor according to an embodiment of the invention.

FIG. 1C shows an example display 150 of a handheld sensor according to an embodiment of the invention. The display 150 identifies for a user various calibration and detection information. The display 150 includes five LEDs that are covered with a translucent piece 160 to form rectangular windows. During calibration, which may be automatic, the top and bottom LED windows are illuminated. The lowermost window stays illuminated by itself upon successful calibration. The middle windows illuminate bottom-to-top as the sensor detects an object. During edge detection, the topmost window is illuminated by itself.

Figure 2:
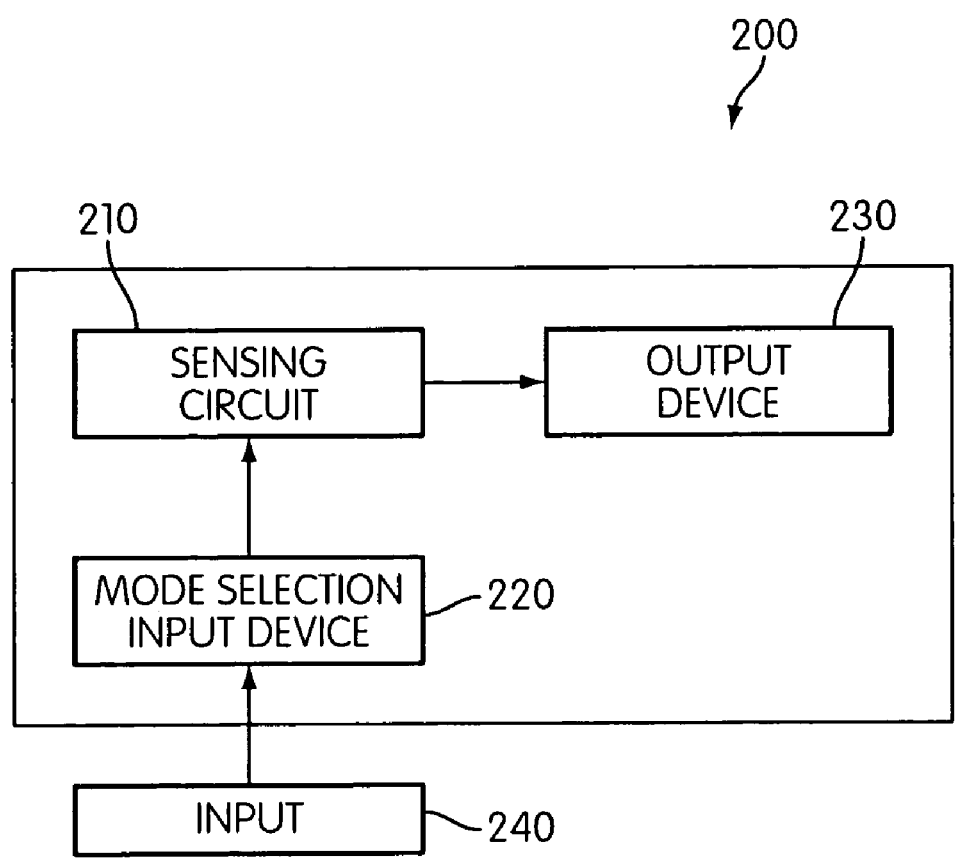
FIG. 2 shows a block diagram of a handheld sensor according to an embodiment of the invention.

FIG. 2 shows a block diagram of a handheld sensor 200 according to an embodiment of the invention. The sensor 200 includes a sensing circuit 210, a mode selection input device 220, and an output device 230. Additional modules may be included in the sensor 200 depending on the scope of capabilities supported by the sensor 200.

The sensing circuit 210 senses the presence of objects behind surfaces, such as metal or nometallic objects. The sensing circuit 210 may be operated in multiple sensitivity modes, such as depth and/or structural composition modes described above. Determinations made by the sensing circuit 210 are outputted via one or more output devices 230, such as, for example, a display (e.g., including one or more LEDs), a beeper, or a voice synthesizer. For example, if the sensing circuit 210 is properly calibrated or the sensing circuit 210 detects an object behind a surface, then a user may be informed via the output device(s) 230. In particular, an audible beep may be sounded if sensor calibration is complete and/or a stud edge is detected. The sensing circuit 210 may be implemented as known now or later developed in the art.

The mode selection input device 220 receives input 240 from a user. Based on the received input 240, the mode selection input device 220 selects a particular mode of operation of the sensing circuit 210. In an embodiment, the mode selection input device 220 enables a user to select a particular mode of operation without first cycling through other modes of operation. For instance, if the user desires to select a 1½ inches depth mode, the user can immediately select that mode, via the mode selection input device 220, without having to first enter a ½ inch depth mode. In an embodiment, the mode selection input device 220 is a single button or switch, such as the button or switch 110 shown in FIG. 1A above.

In a specific example, a handheld sensor has three depth modes. Via a single on/mode button, a user can select a particular mode of operation. The user presses once and holds the button for ½ inch read; double clicks and holds the button for 1 inch read depth; and triple clicks and holds the button for 1½ inches read depth.

Figure 3:
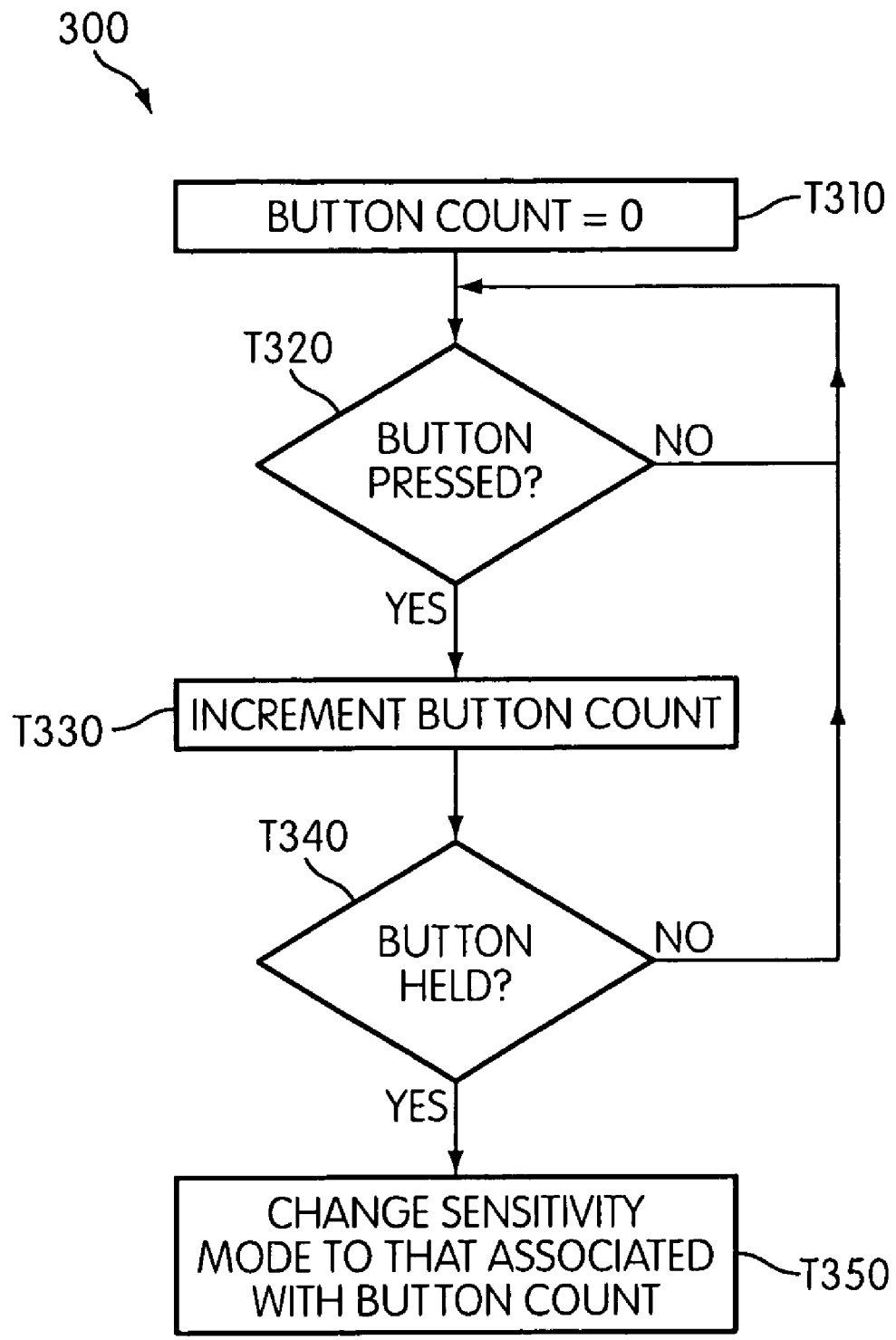
FIG. 3 shows a method of selecting a detection mode according to an embodiment of the invention.

FIG. 3 shows a method 300 of selecting a detection mode according to an embodiment of the invention. In general, the method 300 associates modes with a respective number of presses of an input button or switch, wherein a particular mode is selected only if the button or switch is held after the final press thereof. The method 300 may be implemented in the mode selection input device 220 of FIG. 2, for example.

Task T310 sets a button count variable to zero, signifying that an input button has not yet been pressed by a user. Task T320 determines whether the button has been pressed. If so, then task T330 increments the button count. Task T340 determines whether the button has been held. For instance, task T340 may employ a timer and declare a held condition if the button is held for at least 1.5 seconds. If the button has not been held, then the method returns to task T320 to check for button presses. If the button has been held, then task T350 changes the sensitivity mode of a sensing circuit to the mode associated with the current value of the button count.

The tasks in FIG. 3 are shown by way of illustration. Additional and/or alternative tasks may be implemented. For instance, the button count variable may be reset to zero if, following the pressing of one or more buttons, a held condition is not detected for a predetermined time period.

Figure 4A:
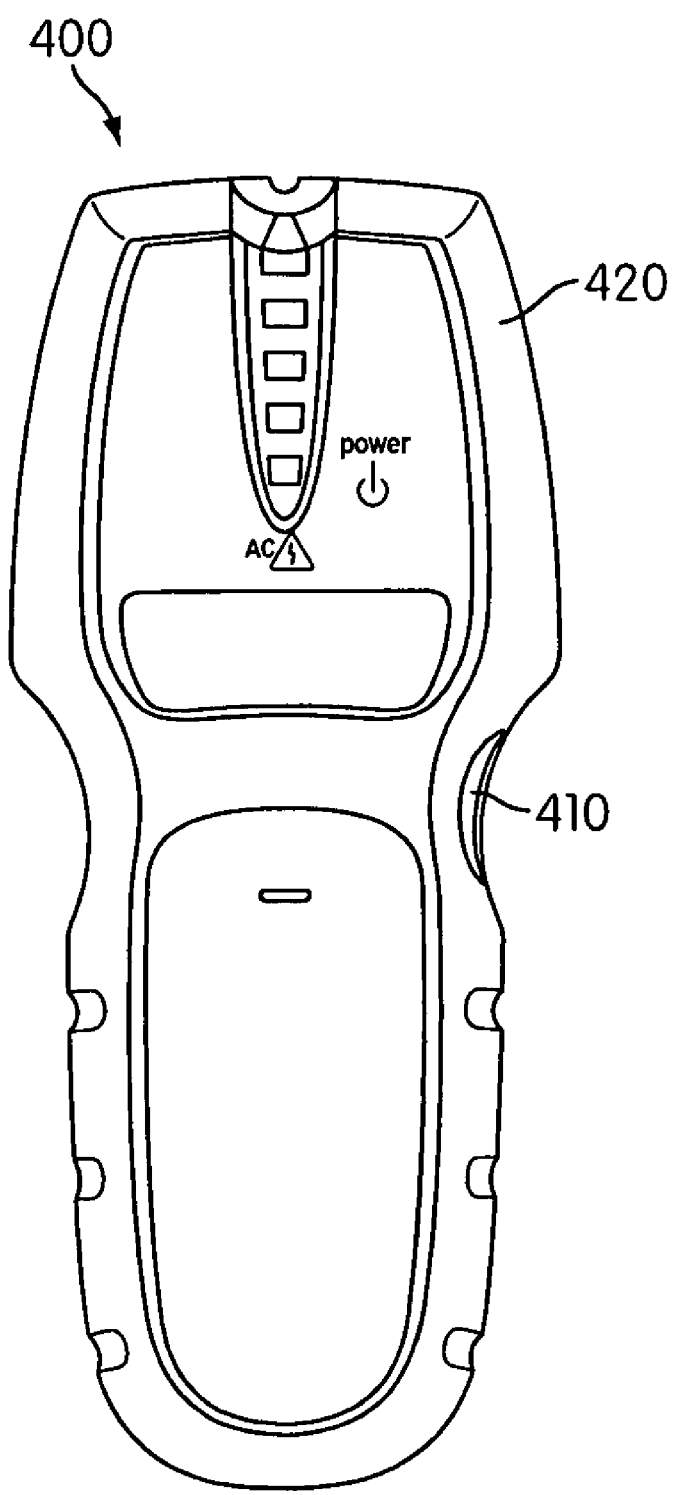
FIG. 4A shows a handheld sensor according to an embodiment of the invention.

FIG. 4A shows a handheld sensor 400 according to an embodiment of the invention. The sensor 400 is used to detect the presence of a live electrical wire or other conducting material hidden behind a surface, such as a wire behind or within concrete, drywall, plasterboard, and/or other building materials. In an embodiment, the sensor 400 may detect alternating current (A/C) continuously up to at least a 2-inch depth.

The sensor 400 may include a button or switch 410 or other input device by which a user can select a live wire detection mode. If the sensor 400 can detect live wires whenever the sensor 400 is turned on, then the button 410 may be an on button. The sensor 400 includes an A/C warning display 420 that serves to inform a user that A/C has been detected. In FIG. 4A, the shape and configuration of the sensor 400, including the position of the button 410 on the sensor 400, are exemplary in nature.

Figure 4B:
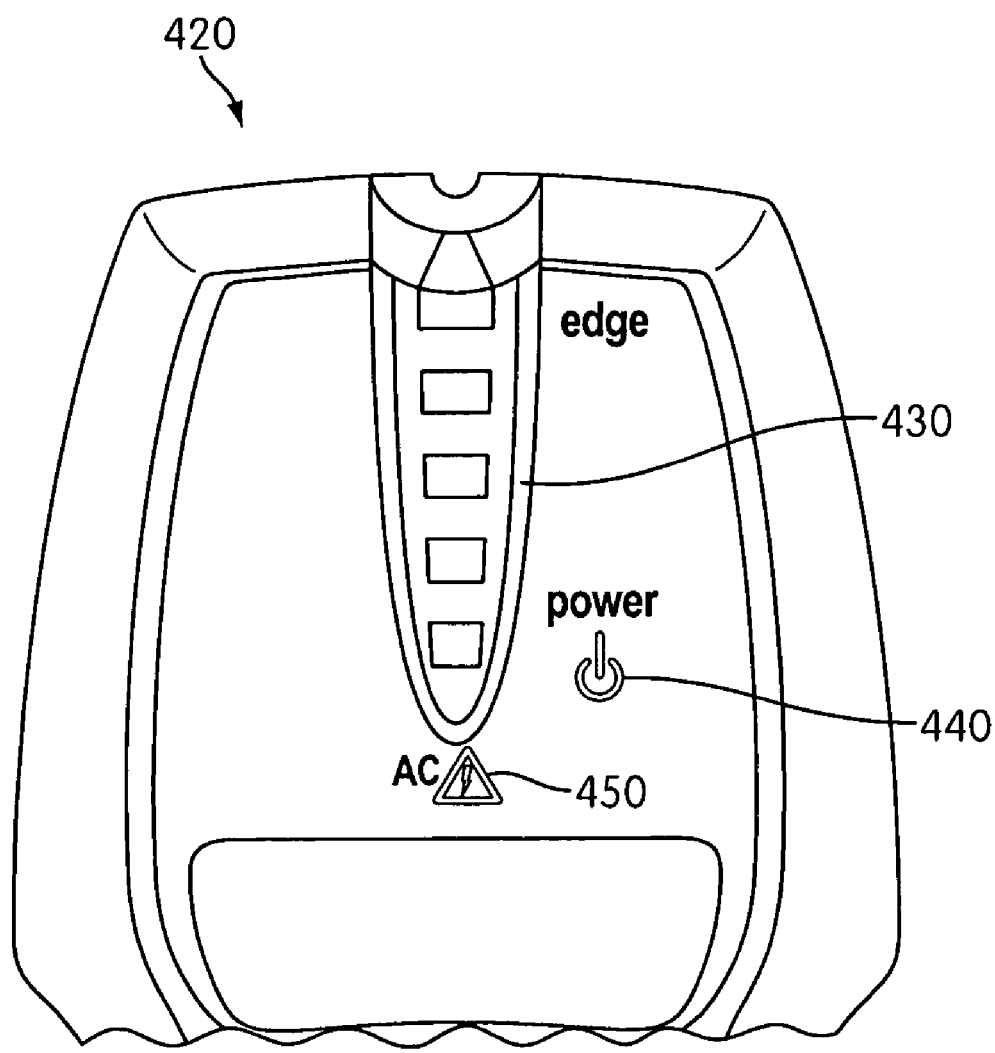
FIG. 4B shows an example display of a handheld sensor according to an embodiment of the invention.

FIG. 4B shows an example display 420 of a handheld sensor according to an embodiment of the invention. The display 420 identifies for a user a status of live wire detection. In particular, the display 420 includes a clear plastic "U"-shaped yoke element 430. When a live wire is detected, the element 430 is illuminated by an LED 440 at the base center line position. The base location 450 of the "U" is silk-screened with the letters "A/C" and an A/C icon.

Figure 5:
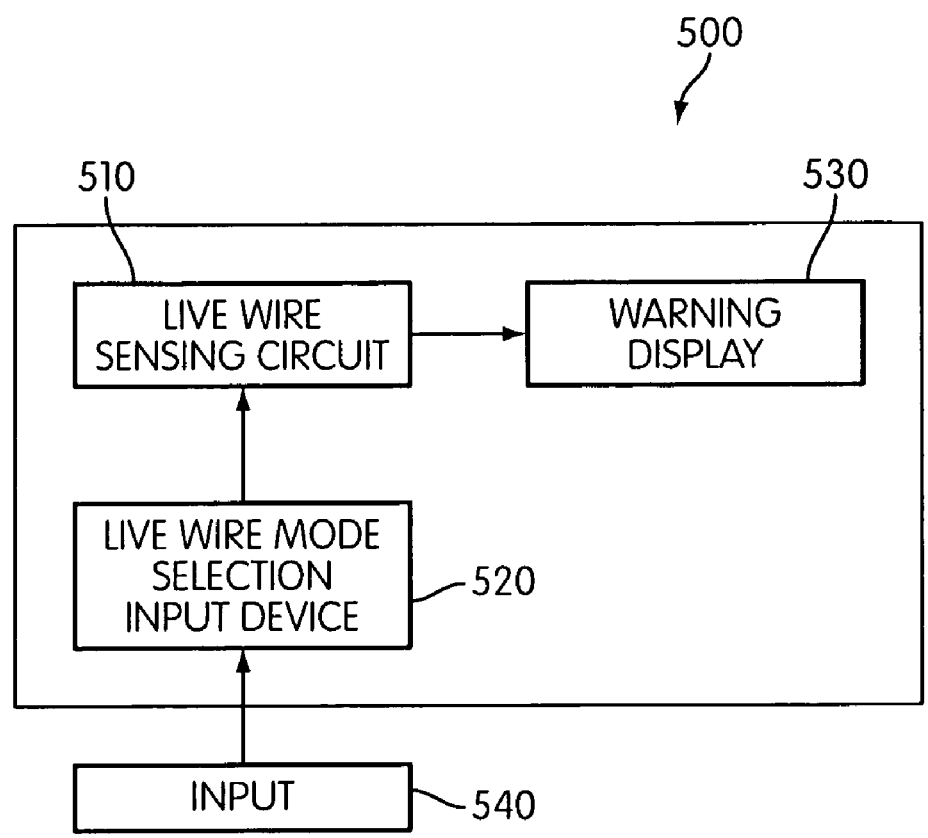
FIG. 5 shows a block diagram of a handheld sensor according to an embodiment of the invention.

FIG. 5 shows a block diagram of a handheld sensor 500 according to an embodiment of the invention. The sensor 500 includes a live wire sensing circuit 510, a live wire mode selection input device 520, and a warning display 530. Additional modules may be included in the sensor 500 depending on the scope of capabilities supported by the sensor 500. For example, the sensor 500 may include output device(s) besides the warning display 530, such as an alarm (e.g., beeper). The live wire mode selection input device 520 need not be included if the sensor 500 operates in a live wire detection mode whenever turned on. Alternatively, the live wire mode selection input device 520 may be an on button for the sensor 500.

The live wire sensing circuit 510 senses the presence of A/C behind surfaces. Determinations made by the live wire sensing circuit 510 are outputted via a warning display 530 and/or one or more output devices, such as other display(s), a beeper, or a voice synthesizer. For example, if the live wire sensing circuit 510 determines that a live wire is present behind a surface, then a user may be informed of this determination via the warning display 530. The live wire sensing circuit 510 may be implemented as known now or later developed in the art.

The live wire mode selection input device 520 receives input 540 from a user. Based on the received input 540, the live wire mode selection input device 520 enables a user to select a live wire detection mode of the live wire sensing circuit 510.

Figure 6A:
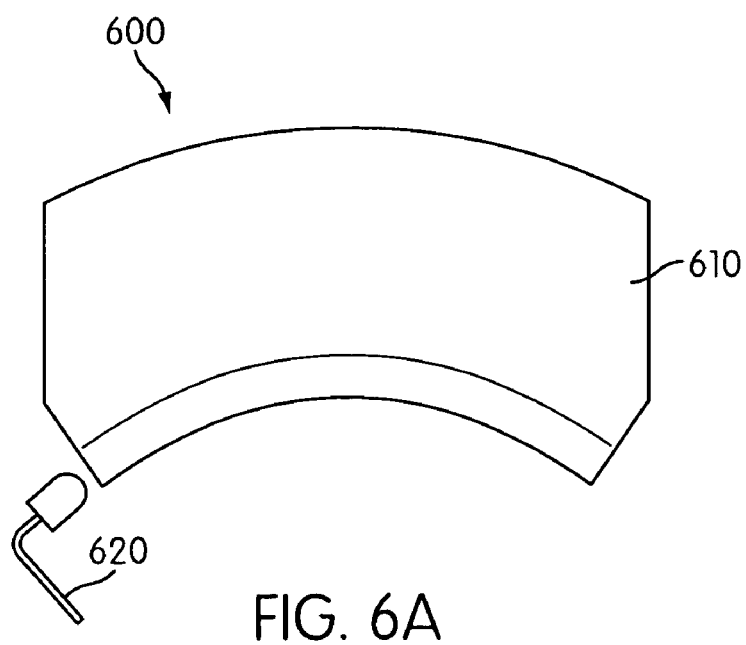
FIG. 6A shows a system for a display according to an embodiment of the invention.

FIG. 6A shows a system 600 for a display according to an embodiment of the invention. The system 600 may be used for a warning display of a sensor, such as the warning display 530 of the sensor 500 in FIG. 5. Alternatively or additionally, the system 600 may be used for other displays of a sensor, such as those related to detection of wood and/or metal studs and/or mode calibration.

The system 600 includes a light pipe 610 and one or more LEDs 620. The light pipe 610 may comprise an optical element, such as, for example, a transparent lens, such as a plastic acrylic lens having recess(es) to receive one or more LEDs 620. In an embodiment, the optical element may be positioned behind a face (e.g., a clear plastic window) of a sensor housing. The light pipe 610 may be formed into numerous three-dimensional geometries, and the U-shaped geometry shown in FIGS. 4A and 6A is merely an example. In an embodiment, the light pipe 610 has a circular cross-section. In addition, the light pipe 610 may be an optical fiber with a textured surface.

In operation, when a live wire is detected by a sensor, the LED 620 is illuminated. The light from the LED 620 travels through the light pipe 610 to illuminate a warning display. Thus, a small light source (the LED) is dispersed into a very large light source (the light pipe). Such a system may be implemented in a highly cost effective manner.

In an embodiment, the light pipe 610 may be illuminated at different levels of intensity corresponding to proximity of the handheld sensor to a live wire being detected.

Figure 6B:
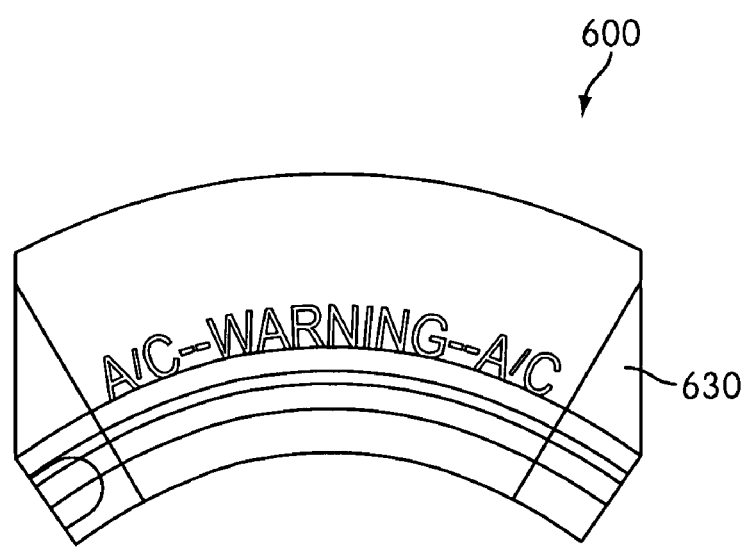
FIG. 6B shows an A/C warning display according to an embodiment of the invention.

FIG. 6B shows an example A/C warning display 630 according to an embodiment of the invention. The warning display 630 may utilize the system 600 in FIG. 6A. The warning display 630 may include a light pipe with recessed text cavities forming the words "A/C—WARNING—A/C." The recessed text cavities may capture light originating from an LED and traveling through the light pipe. A prominent warning may thus be illuminated when a live wire is detected, thus providing greatly enhanced safety for the operator of the handheld sensor.

Figure 7:
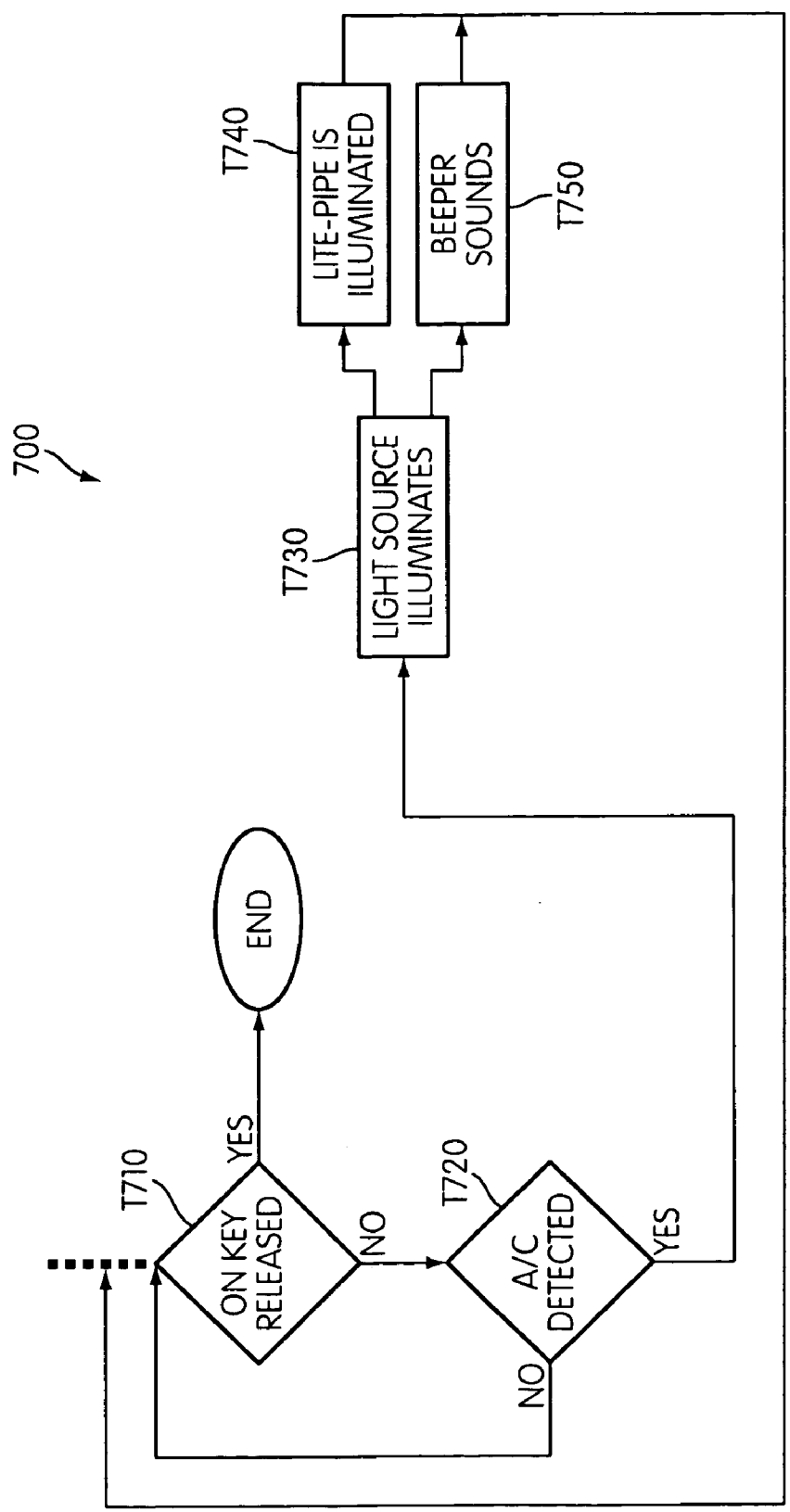
FIG. 7 shows an A/C detection method according to an embodiment of the invention.

FIG. 7 shows an A/C detection method 700 according to an embodiment of the invention. The method 700 may be used in a sensor, such as the handheld sensors 400 or 500 of FIGS. 4A and 5. Task T710 determines whether the on key of a sensor has been released. If so, then the sensor has been turned off, and no A/C detection is undertaken. If the sensor is on, then task T720 determines whether A/C has been detected. If not, the method returns to task T710. If A/C has been detected, then the method proceeds to task T730, which illuminates a light source, such as an LED 620 of FIG. 6A. In task 740, a light pipe, such as the light pipe 610 of FIG. 6A, is illuminated. Task T750 sounds a beeper to alert a user of detected A/C. Task T750 may be omitted in some embodiments.

Figure 8:
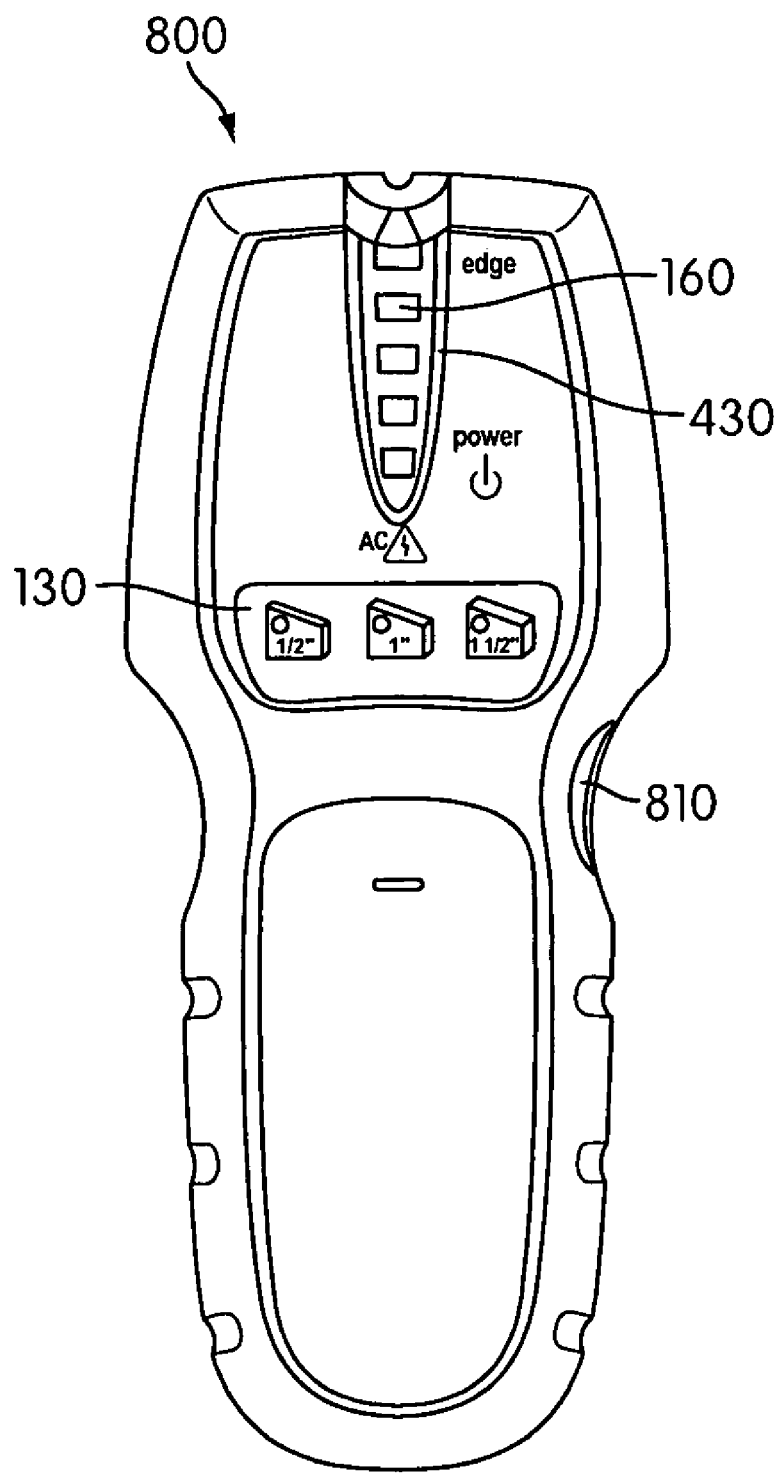
FIG. 8 shows a handheld sensor according to an embodiment of the invention.

FIG. 8 shows a handheld sensor 800 according to an embodiment of the invention. The sensor 800 may combine various features of FIGS. 1–7 above. The sensor 800 is used to detect the presence of objects hidden behind a surface, such as metal or nonmetallic objects, as well as the presence of A/C hidden behind a surface.

In an embodiment, circuitry in the sensor 800 to detect objects is independent of circuitry in the sensor 800 to detect A/C. In addition, object detection circuitry and A/C detection circuitry may have different ranges of tolerance.

The sensor 800 includes a single button or switch 810 by which a user can select from among multiple sensitivity modes and turn on the sensor 800. The sensor 800 also includes an A/C warning element 430 that serves to inform a user that A/C has been detected, as well as other mode, detection, and/or calibration display components, such as the display components 130 and 160 of FIGS. 1B and 1C.

Figure 9:
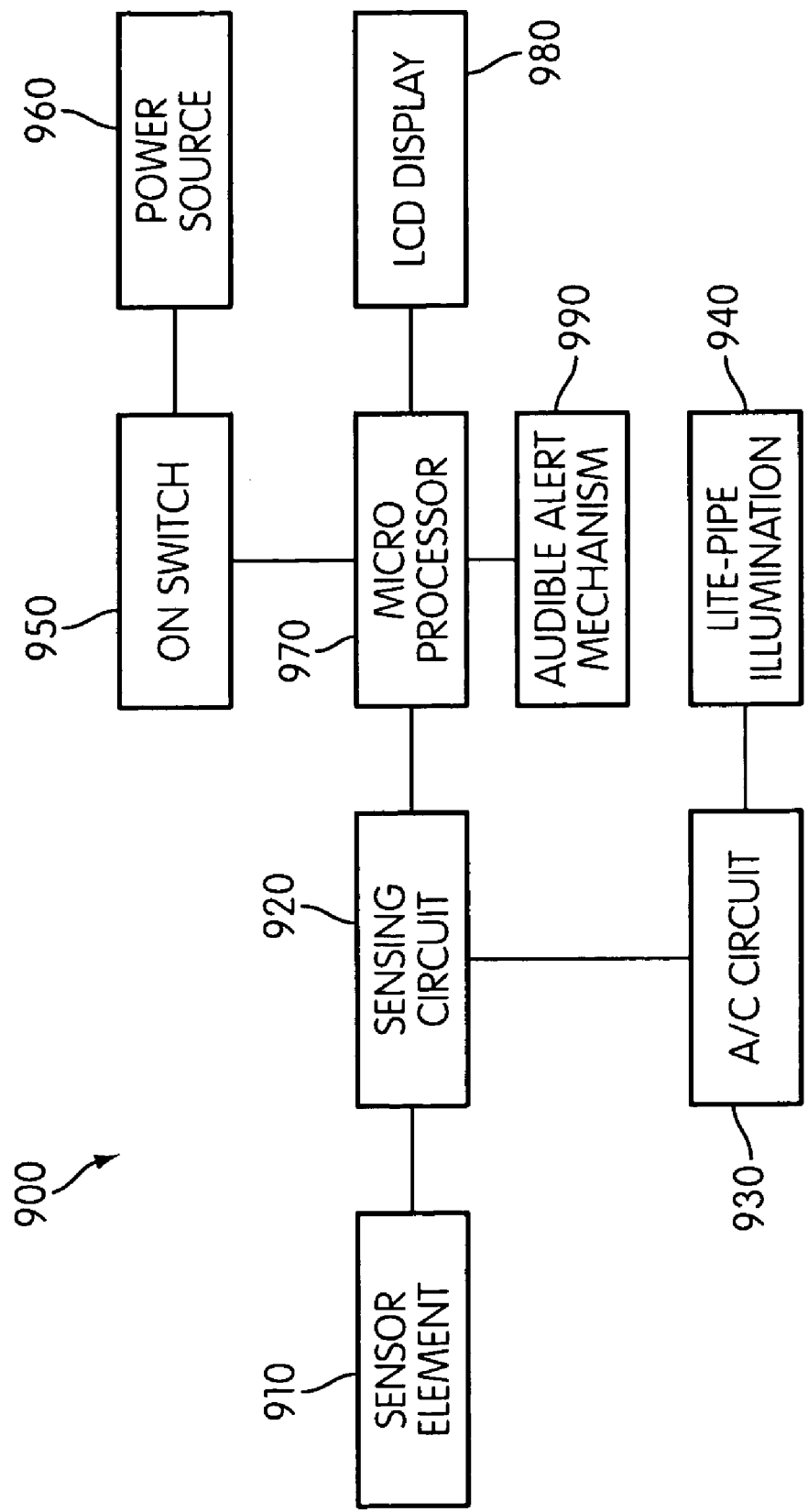
FIG. 9 shows a block diagram of a handheld sensor according to an embodiment of the invention.

FIG. 9 shows a block diagram of a handheld sensor 900 according to an embodiment of the invention. The block diagram may be used to implement the handheld sensor 800 of FIG. 8, though other implementations are possible for the handheld sensor 800. The sensor 900 includes a sensor element 910, a sensing circuit 920, an A/C circuit 930, a light-pipe illumination portion 940, an on switch 950, a power source 960, a microprocessor 970, an LCD display 980, and an audible alert mechanism 990.

The power source 960 supplies power to the sensor 960 when the on switch 950 is closed (i.e., the sensor 960 has been turned on by a user). The microprocessor 970 interfaces with the sensing circuit 920, the audible alert mechanism 990, and the LCD display 980. Depending on control information received from the microprocessor 970 (or another module), the audible alert mechanism 990 (e.g., a beeper) may produce sound(s) to signify that a live wire has been detected, an object has been detected, and/or some other condition has occurred. The LCD display 980 may display information concerning, for example, the detection of objects behind a surface. The light pipe illumination portion 940, which may include LED(s) and a light pipe, may be illuminated when the sensing circuit 920 and A/C circuit 930 detect a live wire behind the surface. The sensor element 910 senses objects behind the surface. In another embodiment (not shown), the audible alert mechanism 990 (or another such mechanism) may interface with the A/C circuit 930.

Figure 10:
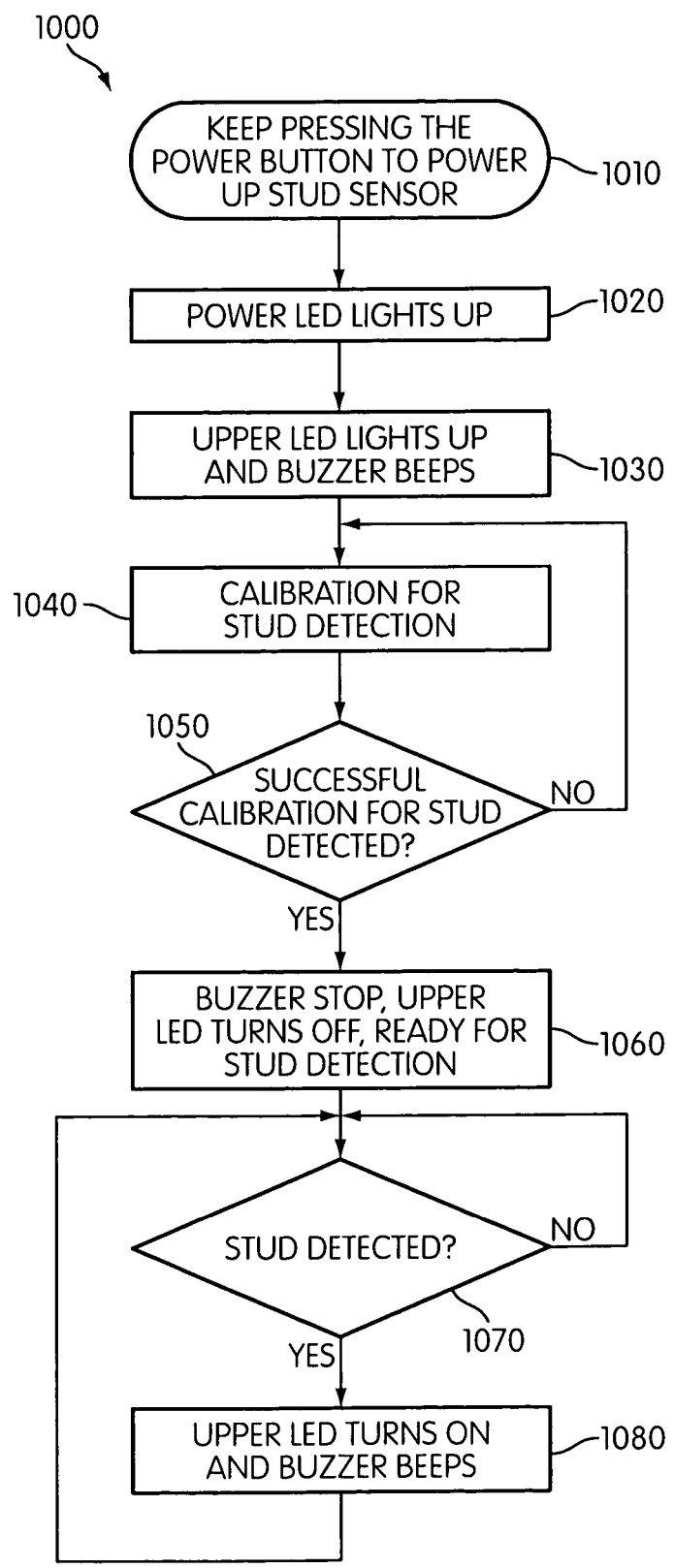
FIG. 10 shows a calibration and detection method according to an embodiment of the invention.

FIG. 10 shows a calibration and detection method 1000 according to an embodiment of the invention. The method 1000 may be used in connection with methods described above, such as the methods 300 and 700 of FIGS. 3 and 7. At a task 1010 depression of a power button to power up a handheld sensor is detected. Based on the detection of task 1010, a task 1020 powers a power indicator to indicate that the handheld sensor has been activated. For example, an LED may be lit as the power indicator. At a task 1030 additional indicators associated with the handheld sensor may be activated to indicate that although the sensor has been activated, calibration has not yet transpired. In one embodiment, the additional indicators include one or more additional LEDs and one or more audible signal generators (e.g., beepers, buzzers, etc.). A task 1040 calibrates the handheld sensor for detection. A task 1050 determines whether the calibration executed at task 1040 was successful. If task 1050 determines that the calibration was successful, the additional indicators are deactivated at a task 1060, and the handheld sensor is ready for stud detection. A task 1070 detects a stud, and/or other objects hidden behind a surface. If a stud (or other object) is detected, task 1080 activates one or more of the additional indicators to indicate the detection of the stud by task 1070.

While the invention has been described by way of example embodiments, it is understood that the words which have been used herein are words of description, rather than words of limitation. Changes may be made within the purview of the appended claims, without departing from the scope and spirit of the invention in its broader aspects. Although the invention has been described herein with reference to particular elements, materials and embodiments, it is understood that the invention is not limited to the particulars disclosed. The invention extends to all equivalent structures, mechanisms, elements and uses which are within the scope of the appended claims. For instance, a mode of operation associated with an input device of a sensor may relate to both depth and structural composition, such as a mode corresponding to a ½ inch depth and a concrete structure.

What is claimed is:

1. A sensing device, comprising:
   a sensing circuit configured to sense the presence of an object beneath a surface and to operate in at least three sensitivity modes; and
   a mode selection input device configured to allow a user to select a desired mode from among the at least three sensitivity modes, the mode selection input device comprising a single button, wherein each sensitivity mode is respectively accessible by the mode selection input device without a need to first access at least one other sensitivity mode.

2. The sensing device of claim 1, wherein each sensitivity mode is accessible by depressing the button a predetermined number of times and then holding the button for a predetermined time period.

3. The sensing device of claim 1, wherein the sensitivity modes are associated with depth beneath the surface.

4. The sensing device of claim 1, wherein the sensitivity modes are associated with structural composition at or beneath the surface.

5. The sensing device of claim 1, further comprising an alternating current (A/C) sensing circuit configured to sense the presence of A/C beneath the surface.

6. The sensing device of claim 5, further comprising a display to indicate the presence of A/C beneath the surface, the display comprising an optical element and at least one light source configured to illuminate the optical element.

7. The sensing device of claim 1, wherein the sensing circuit senses the presence of a stud behind a wall.

8. A sensing device, comprising:
an A/C sensing circuit configured to sense the presence of A/C beneath a surface; and
a display to indicate the presence of A/C beneath the surface, the display comprising an elongated light pipe and at least one light source configured to illuminate the light pipe,
wherein the light pipe is at least in part textured.

9. The sensing device of claim 8, further comprising a lens with at least one recess to receive the at least one light source.

10. The sensing device of claim 9, wherein the lens is at least in part formed of acrylic.

11. The sensing device of claim 8, wherein the light pipe comprises an optical fiber.

12. The sensing device of claim 8, wherein the light source is an LED.

13. A sensing device, comprising:
an A/C sensing circuit configured to sense the presence of A/C beneath a surface; and
a display to indicate the presence of A/C beneath the surface, the display comprising an elongated light pipe and at least one light source configured to illuminate the light pipe,
wherein the display includes text that is illuminated by the light pipe.

14. A sensing device, comprising:
an A/C sensing circuit configured to sense the presence of A/C beneath a surface; and
a display to indicate the presence of A/C beneath the surface, the display comprising an elongated light pipe and at least one light source configured to illuminate the light pipe,
wherein the light pipe comprises an optical fiber disposed in an arcuate configuration and can be viewed by the user.

15. A sensing device, comprising:
a sensing circuit configured to sense the presence of an object beneath a surface and to operate in a plurality of sensitivity modes;
a mode selection input device configured to allow a user to select a desired mode from among the plurality of sensitivity modes; and
a mode indication region configured to visually indicate to the user a currently selected sensitivity mode, the mode indication region including a respective symbolic representation and associated light source for each sensitivity mode, wherein the respective light source of the currently selected sensitivity mode is illuminated.

16. The sensing device of claim 15, wherein the sensitivity modes are associated with depth beneath the surface.

17. The sensing device of claim 15, wherein the symbolic representation comprises a label.

18. The sensing device of claim 17, wherein the label is formed over LEDs comprising the associated light sources.

19. A sensing device, comprising:
a sensing circuit configured to sense the presence of an object beneath a surface;
a display to indicate the presence of the object beneath the surface, the display comprising an elongated light pipe and at least one light source configured to illuminate the light pipe,
wherein the display includes text that is illuminated by the light pipe.

20. The sensing device of claim 19, wherein the sensing circuit is an A/C sensing circuit.

21. A sensing device, comprising:
a sensing circuit configured to sense the presence of an object beneath a surface;
a display to indicate the presence of the object beneath the surface, the display comprising an elongated light pipe and at least one light source configured to illuminate the light pipe,
wherein the light pipe is at least in part textured.

22. A sensing device, comprising:
a sensing circuit configured to sense the presence of an object beneath a surface;
a display to indicate the presence of the object beneath the surface, the display comprising an elongated light pipe and at least one light source configured to illuminate the light pipe,
wherein the light pipe comprises an optical fiber disposed in an arcuate configuration and can be viewed by the user.

* * * * *